United States Patent

Koepp et al.

[15] 3,663,277

[45] May 16, 1972

[54] METHOD OF INSULATING MULTILEVEL CONDUCTORS

[72] Inventors: Ronald L. Koepp, Dayton, Ohio; Janos Havas, Wappingers Falls, N.Y.

[73] Assignee: The National Cash Register Company, Dayton, Ohio

[22] Filed: Aug. 4, 1969

[21] Appl. No.: 847,153

[52] U.S. Cl. ................................ 117/201, 117/101, 117/212, 117/215, 117/217

[51] Int. Cl. ......................... B44d 1/02, C23d 5/02, H01j 1/13

[58] Field of Search ................... 117/101, 201, 212, 215, 217

[56] References Cited

UNITED STATES PATENTS 2,539,410 1/1951 Essig ................................ 117/101 X

FOREIGN PATENTS OR APPLICATIONS 992,044 8/1962 Great Britain ........................ 117/101

*Primary Examiner*—Alfred L. Leavitt
*Assistant Examiner*—Kenneth P. Glynn
*Attorney*—Louis A. Kline, John J. Callahan and John P. Tarlano

[57] ABSTRACT

The present invention relates to a method of forming a thin stratified pinhole-free silicon dioxide insulator layer between multilevel conductors. Silicon dioxide films within the stratified pinhole-free silicon dioxide insulator layer are made from single drops of colloidal silicon dioxide liquid dispersion. These silicon dioxide films are stacked to form a stratified pinhole-free highly insulative silicon dioxide layer between the upper and lower conductors. The thinness of the stratified pinhole-free silicon dioxide insulator layer allows shallow contact windows to be formed therein. A shallow contact window allows reliable electrical contact therethrough between an upper conductor and a lower conductor.

1 Claim, 3 Drawing Figures

INVENTORS
RONALD L. KOEPP &
JANOS HAVAS

BY
Louis A. Kline
John J. Callahan
John P. Tarlano
THEIR ATTORNEYS

INVENTORS
RONALD L. KOEPP &
JANOS HAVAS

BY Louis A. Kline
John J. Callahan
John P. Tarlano
THEIR ATTORNEYS

METHOD OF INSULATING MULTILEVEL CONDUCTORS

BACKGROUND OF THE INVENTION

In the prior art is a method of forming a silicon dioxide insulator layer between upper and lower conductors, by pyrolitically decomposing an organic silicon compound. To attempt to prevent pinholes in such a silicon dioxide insulator layer, it must be made at least 12,000 angstroms thick. A pinhole can cause an electrical short between a lower conductor and an upper conductor. A relatively thick pinhole-free silicon dioxide insulator layer, however, tends to crack an upper conductor when it is passed through a contact window etched through the silicon dioxide insulator layer. Such contact windows, however, are needed to make electrical contact with covered lower conductors.

In the method of the present invention, a thin stratified pinhole-free silicon dioxide insulator layer is formed between upper and lower conductors, using colloidal silicon dioxide. Drops of colloidal silicon dioxide liquid dispersion are each periodically deposited upon lower conductors. When the lower conductors are spun at high velocity, each drop of the colloidal silicon dioxide spreads over the lower conductors to form a 100-angstrom-thick silicon dioxide film. Each individual silicon dioxide film may have pinholes therein. Several films are built upon the lower conductors in this manner to form an 1,100-angstrom-thick stratified pinhole-free silicon dioxide insulator layer. Due to the staggering of pinholes within the silicon dioxide films, the 1,100-angstrom-thick stratified silicon dioxide insulator layer formed upon the lower conductors is pinhole-free. Upper conductors are deposited over the thin pinhole-free stratified silicon dioxide insulator layer, to allow high insulation of the upper conductors from the lower conductors.

Shallow contact windows can be formed in the thin pinhole-free stratified silicon dioxide insulator layer. These contact windows allow reliable electrical contact between the upper conductors and the lower conductors, due to the thinness of the stratified silicon dioxide insulator layer.

SUMMARY OF THE INVENTION

A method of forming a thin, highly insulative, pinhole-free silicon dioxide insulator layer upon the surface of a substrate which supports a plurality of lower electrical conductors, so that upper electrical conductors which are formed on said layer are electrically insulated from said lower electrical conductors except where electrical contact is desired therebetween through apertures provided in said layer, comprising depositing an amount of colloidal silicon dioxide liquid dispersion upon said substrate and said lower electrical conductors to form a thin pinhole-free silicon dioxide insulator layer on said substrate and said lower electrical conductors, and heating said pinhole-free silicon dioxide insulator layer to densify said silicon dioxide layer.

An object of the present invention is to form a thin silicon dioxide insulator layer upon lower conductors, so that shallow contact windows may be formed in said thin silicon dioxide insulator layer.

Another object of the present invention is to form, near room temperature, a thin silicon dioxide insulator layer between upper and lower conductors.

A further object of the invention is to form a thin, pinhole-free silicon dioxide insulator layer between upper and lower conductors.

DESCRIPTION OF THE PREFERRED EMBODIMENT

Figure 1:
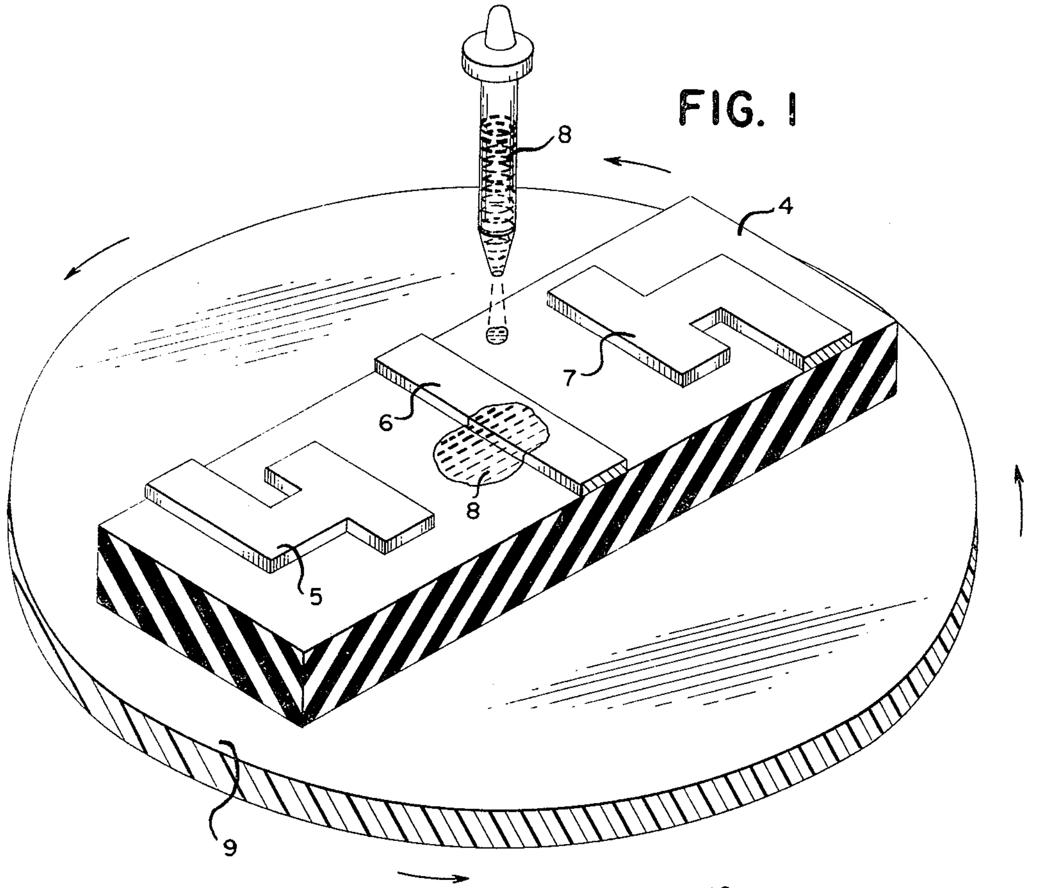
FIG. 1 is a perspective view of the spinning of lower conductors, and the depositing of a colloidal silicon dioxide liquid dispersion thereon.

In FIG. 1, upon a substrate 4, such as a silicon substrate, lie aluminum lower conductors 5, 6, and 7. Said conductors and substrate 4 are spun on a spinner 9 at 10,000 revolutions per minute to aid in the formation of a uniformly thin stratified pinhole-free silicon dioxide insulator layer thereon. Drops of 1 percent, by weight, colloidal silicon dioxide liquid dispersion 8 are, at approximately 10-second intervals, placed upon and at the center of rotation of said lower conductors 5, 6, and 7 while they are spinning on the spinner table 9.

Figure 2:
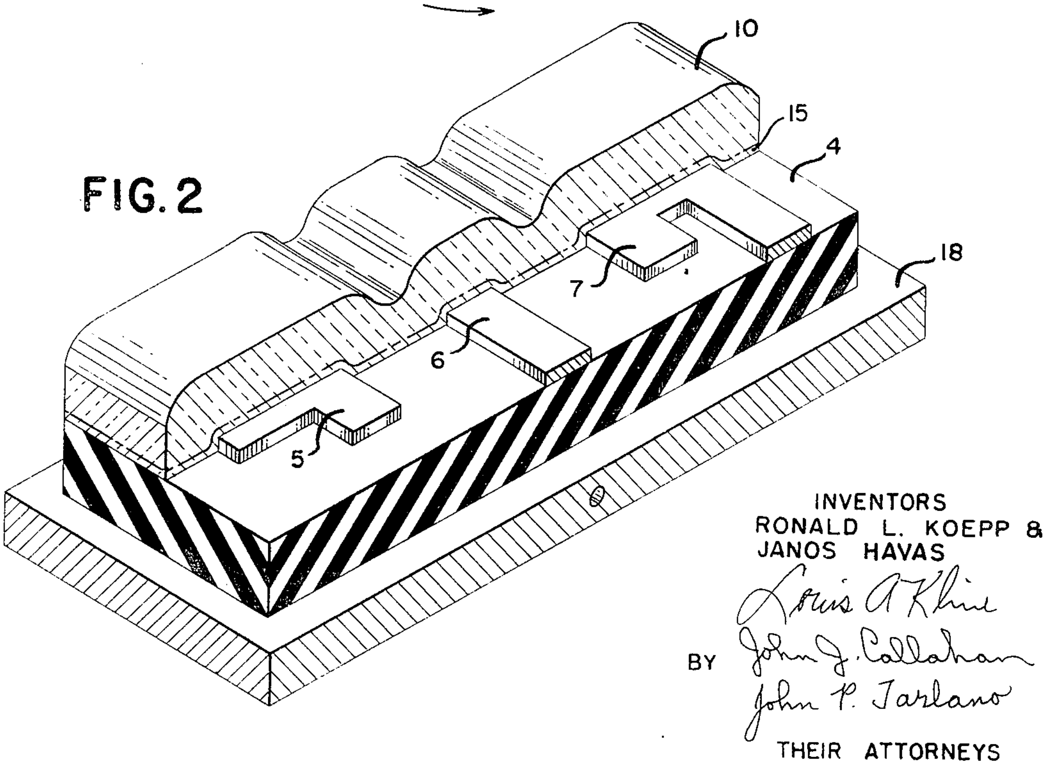
FIG. 2 is a perspective view of the densifying of a thin silicon dioxide insulator layer, which is upon lower conductors.

As shown in FIG. 2, 11 drops of colloidal silicon dioxide liquid dispersion 8 are used to form an 1,100-angstrom-thick stratified pinhole-free silicon dioxide insulator layer 10, which is contoured over the lower conductors 5, 6, and 7. Each drop forms one 100-angstrom-thick film 15 within the stratified silicon dioxide insulator layer 10. The stratified silicon dioxide insulator layer 10 is densified by placing the substrate 4 on an electric heater surface 18 for 2 minutes. The electric heater surface 18 is maintained at a temperature of 500° C. Water is driven out of the stratified silicon dioxide insulator layer 10, to make it more resistant to abrasion.

The colloidal silicon dioxide liquid dispersion which is used is "Ludox-As," made by E. I. duPont de Nemours and Company, of Wilmington, Del., U.S.A. A standard wetting agent, sold under the trademark "Arquad 18–50" and made by Armour Industrial Chemical Company, Chicago, Ill., U.S.A., may be used to provide better adherence of the first drop of colloidal silicon dioxide liquid dispersion to the lower conductors 5, 6, and 7.

Figure 3:
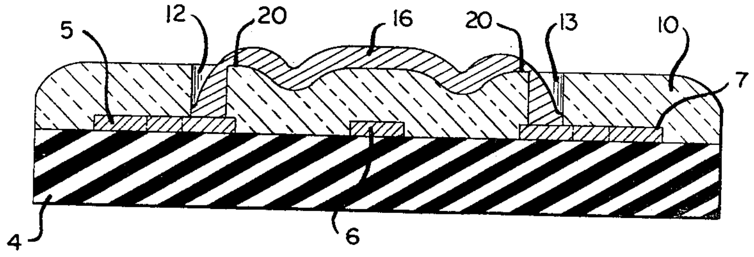
FIG. 3 is a sectional view of a thin stratified silicon dioxide insulator layer between a lower conductor and an upper conductor, the upper conductor also being in electrical contact with two other lower conductors by means of shallow contact windows.

As shown in FIG. 3, into the stratified pinhole-free silicon dioxide insulator layer 10, and above the lower conductors 5 and 7, shallow windows 12 and 13 are formed, by photoresist masking and etching with hydrogen fluoride. A 2,000-angstrom-thick aluminum upper conductor 16 is evaporated, by means of an evaporation mask, onto and between the lower conductors 5 and 7. The upper conductor 16 makes contact with the lower conductors 5 and 7 through the contact windows 12 and 13. The upper conductor 16 is highly electrically insulated from the lower conductor 6.

The upper conductor 16 passes through the shallow contact windows 12 and 13, and onto the lower conductors 5 and 7. The thinness of the pinhole-free silicon dioxide insulator layer 10 helps to prevent discontinuity of the upper conductor 16 at the edges of the shallow contact windows 12 and 13 during evaporation. Only low steps 20 exist between the top of the 1,100-angstrom-thick pinhole-free stratified silicon dioxide insulator layer 10 and the tops of the conductors 5 and 7. The upper conductor 16 can, therefore, more reliably bridge these steps 20. This increased reliability is due to the thinness of the pinhole-free stratified silicon dioxide insulator layer 10.

The stratified silicon dioxide insulator layer 10 need be only 1,100 angstroms thick to form a high insulation between the upper conductor 16 and the lower conductor 6. The breakdown voltage of the 1,100-angstrom-thick stratified silicon dioxide insulator layer 10 is greater than 120 volts. Such a high breakdown voltage of the 1,100-angstrom-thick silicon dioxide insulator layer 10 indicates that it is pinhole-free.

What is claimed is:

1. A method of forming a pinhole-free, stratified, silicon dioxide electrical insulator layer having a controllable thickness of about 1,100A. upon the surface of a substrate which supports a plurality of lower electrical conductors, so that upper electrical conductors which may be formed on said layer are electrically insulated from said lower electrical conductors except where electrical contact is desired therebetween through apertures which may be provided in said layer, comprising spinning said substrate which supports said plurality of lower electrical conductors at a high velocity, simultaneously depositing a selected number of drops of colloidal silicon dioxide liquid dispersion upon and at the center of rotation of said substrate and said plurality of lower electrical conductors at room temperature, each drop forming a silicon dioxide film of about 100A. within said pinhole-free stratified silicon dioxide electrical insulator layer formed on said plurality of lower electrical conductors, and heating said pinhole-free stratified silicon dioxide insulator layer to densify said pinhole-free stratified silicon dioxide electrical insulator layer.

* * * * *